United States Patent
Förster

(12)
(10) Patent No.: US 6,511,421 B2
(45) Date of Patent: Jan. 28, 2003

(54) ENDOSCOPE OPTICS

(75) Inventor: Thomas Förster, Molln (DE)

(73) Assignee: Olympus Winter & IBE GmbH, Hamburg (DE)

( * ) Notice: Subject to any disclaimer, the term of this patent is extended or adjusted under 35 U.S.C. 154(b) by 0 days.

(21) Appl. No.: 09/840,763

(22) Filed: Apr. 24, 2001

(65) Prior Publication Data

US 2001/0039371 A1 Nov. 8, 2001

(30) Foreign Application Priority Data

May 2, 2000 (DE) ................................. 200 07 875 U

(51) Int. Cl.⁷ ................................................ A61B 1/06
(52) U.S. Cl. ...................... 600/176; 600/182; 359/362
(58) Field of Search .................. 359/434, 423, 359/362; 600/176, 107, 160, 182

(56) References Cited

U.S. PATENT DOCUMENTS

| | | | | |
|---|---|---|---|---|
| 5,020,893 A | * | 6/1991 | Karst et al. | 359/435 |
| 5,188,092 A | * | 2/1993 | White | 359/435 |
| 5,568,312 A | * | 10/1996 | Horton | 359/362 |
| 6,038,079 A | * | 3/2000 | Michaels | 359/656 |

* cited by examiner

Primary Examiner—Teresa Walberg
Assistant Examiner—Thor Campbell
(74) Attorney, Agent, or Firm—Rankin, Hill, Porter & Clark LLP

(57) ABSTRACT

An endoscope optics is fitted with a rigid stem and an objective lens is received in a distal end of the stem. The stem also receives an image transmission device for transmitting images away from the objective lens toward a proximal end of the stem. The image transmission device consists of a plurality of spaced apart optical lenses. At least one of the plurality of spaced apart lenses is made of sapphire.

4 Claims, 1 Drawing Sheet

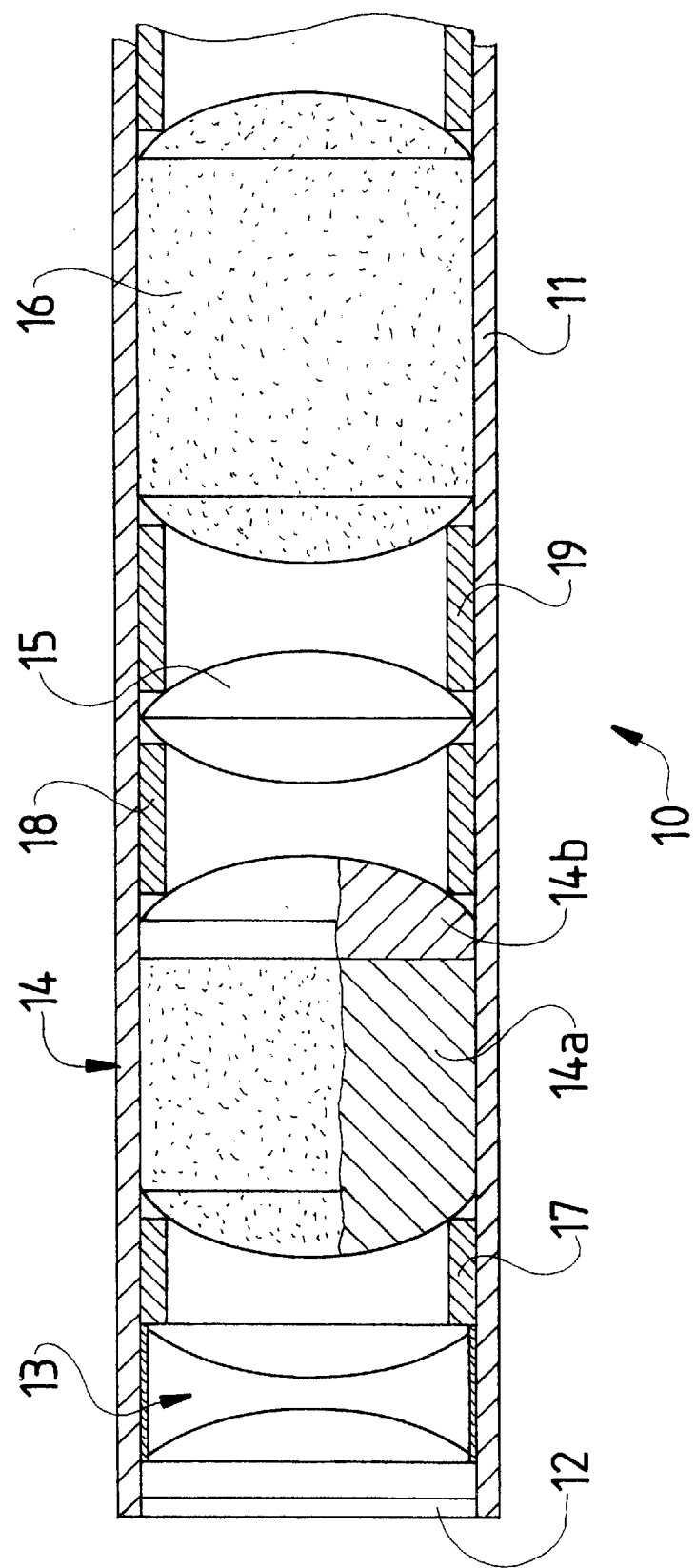

ENDOSCOPE OPTICS

BACKGROUND OF THE INVENTION

1. Field of the Invention

The present invention is generally directed toward endoscopes and, more particularly, toward image transmission devices used in endoscope optics.

2. Description of Related Art

Endoscope optics conventionally include a proximal image viewing system, for instance an ocular or a camera, and a tubular stem with an objective fitted into its distal end. The endoscope also includes an image transmission device that is disposed between the objective and the image viewing system. The image transmission device consists of several optical lenses. These optical lenses are almost always thick rod-shaped lenses that are spaced apart from one another inside the stem.

Many applications require endoscope optics of minimal stem diameters. In particular as regards such narrow optics, but also in general endoscope optics, a problem arises in that the lens elements used for image transmission are easily damaged because of their particular geometries. Minor shocks or bending stresses applied to the stem may break or chip the lens elements. Repairs are very costly and in most cases the entire stem must be replaced.

Accordingly, there exists a need in the art for an endoscope optics system that is substantially more resistant to shocks and bending stresses, and that will therefore be more durable.

SUMMARY OF THE INVENTION

The present invention is directed toward an endoscope optics having image transmission devices that are substantially more resistant to damage from shocks and bending stresses.

In accordance with one aspect of the invention, the optical elements of the image transmission device are made in part or in whole of sapphire.

Compared with conventional optical glass, sapphire offers a number of advantages. One essential advantage is its mechanical strength which, compared to conventional optical glasses, offers a substantially higher resistance against breakage or chipping.

Moreover, sapphire exhibits a relatively high index of refraction. Lens elements offering good imaging properties may be made at comparatively low cost from sapphire. Also, lens elements with spectral transmission properties may be made within a wide range of wavelengths by resort to simple anti-reflection coatings.

Endoscope optics are known from WO 99/19752 of which the distal objective lenses are made of sapphire. Sapphire was used to improve the optical properties of the objective lens. On the other hand, conventional optical glass incurring the above-cited drawbacks was used for the image transmission devices described in WO 99/19752.

As a rule, several rod-shaped thick lenses are used in conventional image transmission devices and also in the image transmission devices of the present invention. The rod-shaped thick lenses implement the image transmission through the stem over a large portion of the optical path. The thickness of the rod-shaped lens elements is a multiple of its diameter and explains their special susceptibility to mechanical stresses.

Besides the aforementioned rod elements, one or more optical correcting lens elements may additionally be used in the transmission path in order to compensate for any chromatic aberration or the like. These corrective elements are made of a glass other than that used for the rod lenses and their thickness is substantially less.

Accordingly, a preferred embodiment of the invention provides that the image transmission devices of endoscope optics comprise several different kinds of lenses of which only those that are especially susceptible to breaking or chipping on account of their geometries shall be made of sapphire, whereas the corrective lenses used to compensate any optic defects in the transmission path and which are less susceptible being made of another optic glass.

Conceivably again, compound lens elements such as a plano-convex thick lens made of sapphire and a further and thinner plano-convex lens made of another glass might be used in the image transmission device, both lens elements abutting each other by their plane surfaces and for instance being bonded together.

BRIEF DESCRIPTION OF THE DRAWING

These and further features of the invention will be apparent with reference to the following description and drawing wherein an illustrative embodiment of a distal end an endoscope according to the present invention is shown.

DETAILED DESCRIPTION OF THE PREFERRED EMBODIMENTS

With reference to the drawing figure, a distal end zone of a stem 10 of an endoscope optics is shown.

The stem 10 is a tube 11 that is sealed at its distal end in vapor- and liquid-tight manner by a pane of clear glass 12. An objective lens 13 with two optic lens elements is configured proximally adjacent the pane of glass 12, as illustrated.

The image generated by the objective lens 13 is transmitted by an image transmission device toward the proximal end of the stem 10. The image transmission device consists of several optic lenses 14, 15 and 16. The reference 14 denotes a convex-convex rod-like thick compound lens of two plano-convex elements 14a and 14b. The reference 16 denotes a convex-convex thick rod lens. The reference 15 denotes an optically correcting lens for defect compensation.

The lenses 14, 15 and 16 are inserted into the tube 11 with slight play, and are held in place by spacer rings 17, 18 and 19.

The lens element 14a and the thick rod lens 16, which are especially in danger of breaking on account of their thickness/diameter ratio, are made of sapphire in the manner of the invention, whereas the lens elements 14b and 15 are made of another optical glass. The lens elements 14a, 16 made from sapphire are indicated in the Figure by dotting or speckling.

This design is meant to show only a few of the various embodiment modes, and endoscope optics of the invention also may be designed otherwise than shown in this Figure.

For example, the lens element 14b and the lens 15 may alternatively be used for compensation and need not be jointly present in an image transmission device as shown in the Figure.

Furthermore rod-shaped thick compound lenses composed of two plano-convex lens elements, each made of sapphire, also may be used. This configuration offers the advantage that plano-convex sapphire lens elements are easier to manufacture than single, convex-convex rod lens elements. In general and in order to minimize optical defects at the junction, for instance at the bonding surfaces, such rod-shaped thick compound lenses should be made up of one lens element of comparatively great thickness and of one comparatively much thinner lens element.

Accordingly, it should be clear that the present invention is capable of numerous modifications, rearrangements, and substitutions of parts without departing from the scope and spirit of the invention as defined in the claims appended hereto.

What is claimed is:

1. An endoscope optics fitted with a rigid stem, an objective lens being received in a distal end of said stem, said stem also receiving an image transmission device for transmitting images away from the objective lens toward a proximal end of said stem, said image transmission device consisting of a plurality of spaced apart optical lenses, wherein at least one of said plurality of spaced apart lenses is made of sapphire.

2. The endoscope optics as claimed in claim 1, wherein the image transmission device comprises several rod-shaped, thick lenses (14, 16).

3. The endoscope optics as claimed in claim 1, wherein at least one of the lenses of the image transmission device is a convex-convex compound lens (14) containing two plano-convex lens elements (14a, 14b), and wherein at least one (14a) of said two plano-convex lens elements is made of sapphire.

4. The endoscope optics as claimed in claim 2, wherein at least one of the lenses of the image transmission device is a convex-convex compound lens (14) containing two plano-convex lens elements (14a, 14b), and wherein at least one (14a) of said two plano-convex lens elements is made of sapphire.

* * * * *